(12) United States Patent
Nabeshima et al.

(10) Patent No.: US 9,843,233 B2
(45) Date of Patent: Dec. 12, 2017

(54) INSULATED ELECTRIC WIRE AND COIL

(71) Applicant: Hitachi Metals, Ltd., Tokyo (JP)

(72) Inventors: Shuta Nabeshima, Hitachi (JP); Yuki Honda, Hitachi (JP); Hideyuki Kikuchi, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 15/039,438

(22) PCT Filed: Jun. 27, 2014

(86) PCT No.: PCT/JP2014/067287
§ 371 (c)(1),
(2) Date: May 26, 2016

(87) PCT Pub. No.: WO2015/198491
PCT Pub. Date: Dec. 30, 2015

(65) Prior Publication Data
US 2016/0380499 A1    Dec. 29, 2016

(51) Int. Cl.
*H01B 3/30* (2006.01)
*H01B 3/40* (2006.01)
*H01B 3/44* (2006.01)
*H01B 7/295* (2006.01)
*H02K 3/30* (2006.01)
*H01F 5/06* (2006.01)
(Continued)

(52) U.S. Cl.
CPC ............... *H02K 3/30* (2013.01); *H01B 3/308* (2013.01); *H01B 7/0009* (2013.01); *H01F 5/06* (2013.01); *H01F 27/28* (2013.01)

(58) Field of Classification Search
CPC . H01B 3/00; H01B 3/308; H01B 7/00; H01B 7/0009; H01B 7/0208; H02K 3/30
USPC ....................................... 174/110 E
See application file for complete search history.

(56) References Cited

U.S. PATENT DOCUMENTS 4,659,789 A     4/1987  Katto et al.
6,476,182 B1 *  11/2002 Auman ............... C08G 73/1014
                                                    528/125
(Continued)

FOREIGN PATENT DOCUMENTS

JP      S 61-176658 A    8/1986
JP      2004-186063 A    7/2004
(Continued)

OTHER PUBLICATIONS

International Search Report (ISR) (PCT Form PCT/ISA/210), in PCT/JP2014/067287, dated Feb. 24, 2015.
(Continued)

*Primary Examiner* — Chau N Nguyen
*Assistant Examiner* — Roshn Varghese
(74) *Attorney, Agent, or Firm* — McGinn IP Law Group, PLLC.

(57) ABSTRACT

An insulated electric wire includes a rectangular conductor and an insulation film disposed on the periphery of the rectangular conductor. The insulation film is characterized by: the provision of a resin containing an imide structure within a molecule; and a peak value of less than 1.0 for the loss tangent tan δ, which is represented by the ratio between the loss elastic modulus and the storage elastic modulus, as measured in the 50 DEG C. to 400 DEG C. range.

12 Claims, 1 Drawing Sheet

(51) Int. Cl.
*H01F 27/28* (2006.01)
*H01B 7/00* (2006.01)

(56) References Cited

U.S. PATENT DOCUMENTS

| | | | | |
|---|---|---|---|---|
| 7,155,094 | B2* | 12/2006 | Donetti | C08K 5/053 385/100 |
| 2004/0186214 | A1* | 9/2004 | Li | D04H 1/4291 524/474 |
| 2009/0269597 | A1* | 10/2009 | Bito | B32B 15/08 428/458 |
| 2009/0306306 | A1* | 12/2009 | Ohkido | C08G 73/1007 525/410 |
| 2012/0085570 | A1* | 4/2012 | Kim | C08G 73/1042 174/254 |
| 2013/0161065 | A1* | 6/2013 | Honda | H01B 3/30 174/120 SR |

FOREIGN PATENT DOCUMENTS

| | | |
|---|---|---|
| JP | 2012-224697 A | 11/2012 |
| JP | 2013-253124 A | 12/2013 |

OTHER PUBLICATIONS

Chinese Office Action, dated Dec. 1, 2016, in Chinese Application No. 201480065037.0 and English Translation thereof.
Japanese Office Action, dated May 23, 2017 and English Translation thereof.
Notification of Transmittal of Translation of the International Preliminary Report on Patentability (PCT/IB/338) in PCT Application No. PCT/JP2014/067287 dated Jan. 5, 2017.
Chinese Office Action, dated Aug. 2, 2017, in Chinese Application No. 201480065037.0 and English Translation thereof.

* cited by examiner

INSULATED ELECTRIC WIRE AND COIL

BACKGROUND OF THE INVENTION

1. Field of the Invention

This invention relates to an insulated electric wire and a coil using that insulated electric wire.

2. Description of the Related Art

Generally, insulated electric wires for use for coils for electrical devices such as motors, transformers, etc. are required to be superior in electrically insulating properties, heat resistance, and mechanical properties such as flexibility and the like.

In recent years, motors have been reduced in size and weight. When a high power motor has been built into a small space, an insulated electric wire having a rectangular cross sectional shape has been widely used in order to increase a proportion of a cross sectional area of an electrical conductor in the insulated electric wire used in the small space.

In addition, along with high voltage driving for high power, inverter driving for power performance enhancement has been being developed rapidly. Because the motor is driven by a high voltage while at the same time being driven by an inverter, there is a high risk that a superposition of a high drive voltage and an inverter surge is likely to cause a partial discharge in the insulated electric wire of the motor, leading to dielectric breakdown.

For that reason, in recent years, in order to prevent the dielectric breakdown due to the occurrence of partial discharge, the insulated electric wire has been designed to have a high partial discharge inception voltage (PDIV).

It is known that the PDIV of the insulated electric wire is enhanced, for example, by lowering the dielectric constant of its insulation film. As the insulated electric wire with its insulation film having a reduced dielectric constant, Patent Document 1 for example discloses an insulated electric wire using in an electrically insulating layer a polyimide resin varnish having an imide group concentration of 15 to 20 percent after imidization of a polyimide precursor resin using a bisphenol A diphthalic acid dianhydride (BPADA) and a given aromatic diamine.

PRIOR ART DOCUMENTS

Patent Document

[Patent Document 1] JP-A-2012-224697

SUMMARY OF THE INVENTION

Problems to be Solved by the Invention

The insulated electric wire has been designed to have a high PDIV, while in recent years, in motor production, an attempt has been made to omit interphase insulating papers each inserted between phases, respectively. Inserting the interphase insulating papers is very time-consuming, and is therefore a factor in increasing cost. So, omitting the interphase insulating papers allows for reducing cost. For this reason, the insulated electric wire, which is suitable for production of motors from which interphase insulating papers are being omitted, is desired.

As such an insulated electric wire, there is considered an insulated electric wire having a thickened insulating film which is obtained by applying an insulating varnish to an electrical conductor and baking, but when that insulated electric wire is molded (e.g. drawn, bent, twisted, and pressed at its terminal) into a coil, the load on the insulating film becomes high, therefore the molded portion of the insulating film cracks. Particularly when the electrical conductor is in a rectangular shape, it is difficult to form thereover the insulating film uniform and thick in thickness, therefore crack formation tends to be initiated at a portion non-uniform in thickness.

Incidentally, in the insulated electric wire of Patent Document 1, due to the lowering in its dielectric constant and enhancement in its film flexibility, there is concern that heat resistance is likely to lower, and further when the insulation film is formed over a rectangular conductor from an electrically insulating varnish, the thickness of the insulation film is considered to tend to be non-uniform.

Accordingly, it is an object of the present invention to provide an insulated electric wire, which is superior in flexibility even when thickening an insulation film over a rectangular conductor, and a coil using that insulated electric wire.

Means for Solving the Problems

To solve the above problem, the present inventors focused on a loss tangent tan δ that is defined as a loss elastic modulus to storage elastic modulus ratio of the insulation film. By using a material having such a storage elastic modulus that the tan δ had a not greater than constant peak value (maximum value), it was found out that even when thickened over a rectangular conductor, the insulation film tended to be uniformly formed, and the insulated electric wire, which is superior in flexibility even when its insulation film is thickened, was invented.

To achieve the above object, the present invention provides an insulated electric wire and a coil using that insulated electric wire, as specified below.

[1] According to an aspect of one embodiment of the invention, an insulated electric wire comprises:

a rectangular conductor; and an insulation film provided around the rectangular conductor, in which the insulation film is essentially consisted of a resin including an imide structure in a molecule, and has a peak value of a loss tangent tan δ represented by a loss elastic modulus to storage elastic modulus ratio when measured in a range of 50 degrees C. to 400 degrees C. is smaller than 1.0.

[2] The insulated electric wire as specified in [1] above, wherein the peak value of the loss tangent tan δ of the insulation film is not greater than 0.8.

[3] The insulated electric wire as specified in [1] or [2] above, wherein the resin is a polyimide resin.

[4] The insulated electric wire as specified in any one of [1] to [3] above, wherein the resin has an imide concentration of not lower than 28 percent by mass and not higher than 37 percent by mass.

[5] The insulated electric wire as specified in any one of [1] to [4] above, wherein the insulation film is being formed by applying a polyamic acid varnish to a perimeter of the rectangular conductor, and subsequent baking, wherein the polyamic acid varnish is derived from raw materials, one or more selected from 4,4'-diaminodiphenyl ether (ODA), 4,4'-bis(4-aminophenoxy) biphenyl (BAPB), 2,2-bis[4-(4-aminophenoxy) phenyl] propane (BAPP), and 1,3-bis(4-aminophenoxy) benzene (TPE-R), and one or more selected from pyromellitic anhydride (PMDA) and 3,3',4,4'-biphenyltetracarboxylic dianhydride (BPDA).

[6] The insulated electric wire as specified in any one of [1] to [5] above, wherein
the insulation film comprises a thickness of not thinner than 50 µm.

[7] According to an aspect of another embodiment of the invention, a coil is formed by using the insulated electric wire as specified in any one of [1] to [6] above.

Effects of the Invention

The invention allows for providing the insulated electric wire, which is superior in flexibility even when thickening the insulation film over the rectangular conductor, and the coil using that insulated electric wire.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Insulated Electric Wire

Figure 1:
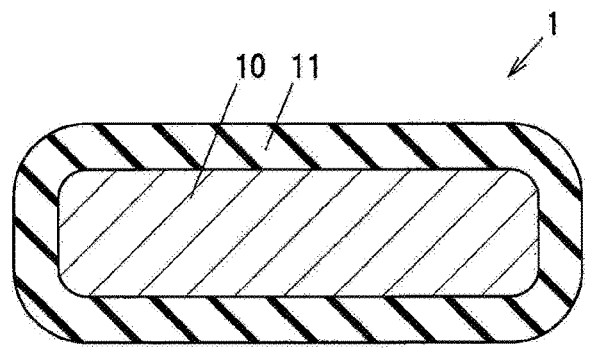
FIG. 1 is a transverse cross sectional view showing one example of an insulated electric wire in an exemplary embodiment of the present invention.

FIG. 1 is a transverse cross sectional view showing one example of an insulated electric wire in an exemplary embodiment of the present invention.

An insulated electric wire 1 in an exemplary embodiment of the present invention is composed of a rectangular conductor 10, and an insulation film 11, which is provided around the rectangular conductor 10, and the insulation film 11 is made of a resin including an imide structure in a molecule, and is has a peak value (maximum value) of a loss tangent tan δ represented by a loss elastic modulus to storage elastic modulus ratio when measured in a range of 50 degrees C. to 400 degrees C. is smaller than 1.0.

Rectangular Conductor

The rectangular conductor 10 is made of an electrically conductive material such as copper. As the copper, there is mainly used an oxygen-free copper, a low oxygen copper or the like. Further, the rectangular conductor 10 may have a multilayer structure, and may be for example a copper wire whose surface is plated with a metal such as nickel or the like. The rectangular conductor 10 is in a substantially rectangular cross sectional shape. Note that the term "substantially rectangular shape" herein includes a rectangular shape with its corners rounded.

Insulation Film

The insulation film 11 is essentially consisted of a resin including an imide structure in a molecule. As the resin including an imide structure in its molecule, there are listed polyamideimide, polyesterimide, and polyimide resins, but from the point of view of heat resistance and mechanical properties, it is preferable that it be a polyimide resin. In particular, the imide concentration may be not lower than 28 percent by mass. If the imide concentration is lower than 28 percent by mass, the heat resistance tends to decrease. The upper limit of the imide concentration is not limited, but is preferably not higher than 37 percent by mass. Note that the imide concentration can be adjusted according to raw materials for constituent components of the resin including an imide structure in its molecule, such as, in the case of the polyimide resin, a diamine component and an acid component which will be described later, or compounding amounts of the raw materials.

The insulation film 11 is has a peak value of a loss tangent tan δ (i.e. a maximum value of tan δ) represented by a loss elastic modulus (G") to storage elastic modulus (G') ratio (G"/G') when measured in a range of 50 degrees C. to 400 degrees C. is smaller than 1.0. The peak value of the loss tangent tan δ is preferably not greater than 0.8, more preferably not greater than 0.7. The lower limit of the peak value of the loss tangent tan δ is not limited, but is preferably not smaller than 0.05.

When the peak value of the loss tangent tan δ when measured in a range of 50 degrees C. to 400 degrees C. of the insulation film 11 is smaller than 1.0, the insulation film obtained by applying and baking an electrically insulating varnish over the rectangular conductor tends to be formed uniform in thickness. That is, if the peak value of the loss tangent tan δ is not smaller than 1.0, the insulation film is considered unlikely to be formed uniformly, and when molded in this condition, crack formation initiated at a portion non-uniform in the thickness of the insulation film tends to occur in the insulation film.

The storage elastic modulus serves as a measure of hardness, while the loss elastic modulus serves as a measure of softness. The greater the peak value of the loss tangent tan δ represented by the loss modulus to storage modulus ratio, the higher the viscosity, therefore being considered to affect the throwing power of the insulation film. Note that the loss tangent tan δ is considered to have a tendency to increase when the imide concentration is decreased. Although this detailed mechanism is unknown, it is inferred that when the imide concentration is decreased, the viscosity increases, therefore the loss tangent tan δ has a tendency to increase.

The loss tangent tan δ can be adjusted according to raw material compounding. For example, in the case of the polyamic acid, the tan δ can be decreased by introducing a rigid component or a mesh structure, while the tan δ can be increased by introducing a bend structure.

The insulation film 11 is formed, for example by applying a varnish (e.g. a polyamic acid varnish) derived from dissolving a polyimide resin precursor in a solvent to a perimeter of the rectangular conductor 10, and baking. This polyimide resin precursor is derived from reacting a diamine component, and an acid component at a temperature of not higher than 100 degrees C.

As the diamine component, there are listed 1,4-diaminobenzene (PPD), 1,3-diaminobenzene (MPD), 4,4'-diaminodiphenylmethane (DAM), 4,4'-diaminodiphenyl ether (ODA), 3,3'-dimethyl-4,4'-diamino biphenyl, 2,2'-dimethyl-4,4'-diamino biphenyl (m-TB), 2,2'-bis(trifluoromethyl) 4,4'-diamino biphenyl, 4,4'-diamino benzophenone, 3,3'-diamino benzophenone, 4,4'-bis(4-aminophenyl) sulfide, 4,4'-diamino diphenylsulfone, 4,4'-diamino benzanilide, 9,9-bis(4-aminophenyl) fluorene (FDA), 1,4-bis(4-aminophenoxy) benzene (TPE-Q), 1,3-bis(4-aminophenoxy) benzene (TPE-R), 4,4'-bis(4-aminophenoxy) biphenyl (BAPB), 2,2-bis(4-aminophenoxy phenyl) propane (BAPP), bis[4-(4- aminophenoxy) phenyl] sulfone (BAPS), 2,2-bis[4-(4-aminophenoxy) phenyl] hexafluoropropane (HFBAPP), and the like. One of these may be used singly, or two or more thereof may be used in combination. From the point of view of properties, it is preferable to use one or more selected from 4,4'-diaminodiphenyl ether (ODA), 4,4'-bis(4-aminophenoxy) biphenyl (BAPB), 2,2-bis[4-(4-aminophenoxy) phenyl] propane (BAPP), and 1,3-bis(4-aminophenoxy) benzene (TPE-R). Further, the diamine component is not limited to those listed above, but it is possible to use any diamine component capable of having a peak value of the loss tangent tan δ when measured in a range of 50 degrees C. to 400 degrees C. of the resulting polyimide resin of smaller than 1.0.

When two or more diamine components are used, the compounding ratio thereof is not particularly limited, but for example, when the ODA and the BAPB are used in combination, the compounding ratio (ODA/BAPB) is preferably set at 40/60 to 95/5, more preferably 50/50 to 90/10 from the point of view of properties or cost.

As the acid component, there are listed pyromellitic anhydride (PMDA), 3,3',4,4'-benzophenone tetracarboxylic acid dianhydride (BTDA), 3,3',4,4'-diphenyl sulfone tetracarboxylic dianhydride (DSDA), 4,4'-oxydiphthalic dianhydride (ODPA), 3,3',4,4'-biphenyltetracarboxylic dianhydride (BPDA), 4,4'-(2,2-hexafluoro isopropylidene) diphthalic dianhydride (6FDA), 2,2-bis[4-(3,4-dicarboxyphenoxy) phenyl] propanoic dianhydride (BPADA), etc. Also, if desired, there may be used 1,2,3,4-butane tetracarboxylic acid dianhydride, 1,2,3,4-cyclopentane tetracarboxylic acid dianhydride, 1,2,4,5-cyclohexane tetracarboxylic acid dianhydride, 5-(2,5-dioxotetrahydro-3-furanyl)-3-methyl-3-cyclohexene-1,2-dicarboxylic acid anhydride, or above listed tetracarboxylic acid anhydride hydrogenated alicyclic tetracarboxylic acid dianhydrides, or the like. One of these may be used singly, or two or more thereof may be used in combination. From the point of view of properties, it is preferable to use one or more selected from pyromellitic anhydride (PMDA) and 3,3',4,4'-biphenyltetracarboxylic dianhydride (BPDA). Further, the acid component is not limited to those listed above, but it is possible to use any acid component capable of having a peak value of the loss tangent tan δ when measured in a range of 50 degrees C. to 400 degrees C. of the resulting polyimide resin of smaller than 1.0.

When two or more acid components are used, the compounding ratio thereof is not particularly limited, but for example, when the PMDA and the BPDA are used in combination, the compounding ratio (PMDA/BPDA) is preferably set at 40/60 to 90/10, more preferably 50/50 to 80/20 from the point of view of properties or cost.

The insulated electric wire 1 can be produced by repetition of, in conventional manner, applying the above described electrically insulating varnish (e.g. a polyamic acid varnish) to the rectangular conductor 10, and baking at on the order of e.g. 350 to 600 degrees C., to form the insulation film 11 of a desired film thickness. Note that the method for producing the insulated electric wire 1 is not limited thereto, but may be any method capable of forming the insulation film 11 of a desired film thickness over the electrical conductor.

The insulation film 11 preferably has its film thickness (its thinnest film thickness in the perimeter direction of the insulation film 11) of not smaller than 50 μm. If it is smaller than 50 μm, the effect of the PDIV enhancement by the thickening of the insulation film decreases. The upper limit of the film thickness is not limited, but is preferably not thicker than 150 μm, more preferably not thicker than 130 μm.

Further, providing a highly adhesive film (an adhesion layer) over the lower side of the insulation film 11 allows for increasing the adhesion between the rectangular conductor 10 and the insulation film 11. The adhesion layer may be provided thinly so as not to affect the properties of the insulated electric wire. For example, the film thickness of the adhesive layer ranges 1 to 10 μm. The providing of the adhesive layer allows for enhancing the adhesion between the insulation film 11 and the rectangular conductor 10 or another insulation film for constituting the insulated electric wire 1 together with that insulation film 11.

Further, there may be formed an insulation film for imparting lubricity to the perimeter of the insulation film 11, or an insulation film for imparting abrasion resistance thereto, or the like. These insulation films are preferably formed by electrically insulating varnish coating and baking.

Coil

Figure 2:
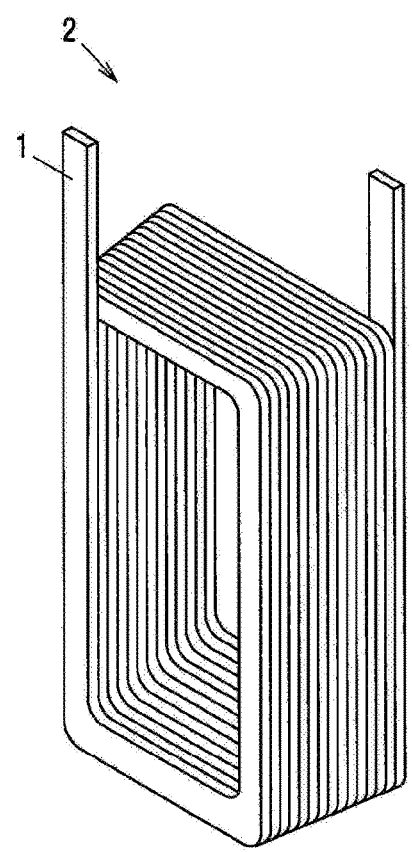
FIG. 2 is a perspective view showing one example of a coil in an exemplary embodiment of the present invention.

FIG. 2 is a perspective view showing one example of a coil in an exemplary embodiment of the present invention.

A coil 2 is characterized by being formed by using the insulated electric wire 1 in the above described exemplary embodiment of the present invention.

The coil 2 is designed to constitute electric devices such as electric motors, electric generators, etc., and is formed by edgewise bending of the insulated electric wire 1. For example, when the coil is mounted to a stator core of the electric device, it is formed by winding the insulated electric wire 1 therearound in a trapezoidal shape in correspondence to the shape of the stator core.

EXAMPLES

Hereinafter, the present invention will be described in more detail by way of examples, but the present invention should not be construed as being limited thereto.

Example 1

In a flask equipped with an agitator, a reflux condenser, a nitrogen inlet tube, and a thermometer, a 4,4'-diaminodiphenyl ether (ODA) was dissolved in a dimethyl acetamide (DMAc), followed by compounding of an equimolar pyromellitic anhydride (PMDA), and subsequent agitation for 12 hours at room temperature, resulting in a polyamic acid varnish. This polyamic acid varnish was diluted and adjusted for coating manipulation.

Example 2

In a flask equipped with an agitator, a reflux condenser, a nitrogen inlet tube, and a thermometer, a 4,4'-diaminodiphenyl ether (ODA) and a 2,2-bis[4-(4-aminophenoxy) phenyl] propane (BAPP) were dissolved in a dimethyl acetamide (DMAc), followed by compounding of a pyromellitic anhydride (PMDA) equimolar to a total amount of the ODA and the BAPP, and subsequent agitation for 12 hours at room temperature, resulting in a polyamic acid varnish. This polyamic acid varnish was diluted and adjusted for coating manipulation.

Example 3

In a flask equipped with an agitator, a reflux condenser, a nitrogen inlet tube, and a thermometer, a 4,4'-diaminodiphenyl ether (ODA) and a 4,4'-bis(4-aminophenoxy) biphenyl (BAPB) were dissolved in a dimethyl acetamide (DMAc), followed by compounding of a pyromellitic anhydride (PMDA) and a 4,4'-biphenyltetracarboxylic dianhydride (BPDA) in such a manner that a total amount thereof was equimolar to a total amount of the ODA and the BAPP, and subsequent agitation for 12 hours at room temperature, resulting in a polyamic acid varnish. This polyamic acid varnish was diluted and adjusted for coating manipulation.

Example 4

In a flask equipped with an agitator, a reflux condenser, a nitrogen inlet tube, and a thermometer, a 4,4'-diaminodiphenyl ether (ODA) and a 1,3-bis(4-aminophenoxy) benzene (TPE-R) were dissolved in a dimethyl acetamide (DMAc), followed by compounding of a pyromellitic anhydride (PMDA) equimolar to a total amount of the ODA and the TPE-R, and subsequent agitation for 12 hours at room temperature, resulting in a polyamic acid varnish. This polyamic acid varnish was diluted and adjusted for coating manipulation.

Comparative Example 1

In a flask equipped with an agitator, a reflux condenser, a nitrogen inlet tube, and a thermometer, a 2,2-bis[4-(4-aminophenoxy) phenyl] propane (BAPP) was dissolved in a dimethyl acetamide (DMAc), followed by compounding of an equimolar bisphenol A diphthalic dianhydride, and subsequent agitation for 12 hours at room temperature, resulting in a polyamic acid varnish. This polyamic acid varnish was diluted and adjusted for coating manipulation.

Production of Insulated Electric Wires in Examples 1 to 4 and Comparative Example 1

Insulated electric wires having a film thickness of 50 μm were produced by by repetition of, in conventional manner, applying the diluted and adjusted polyamic acid varnishes each to a rectangular conductor respectively, and baking at on the order of 350 to 600 degrees C.

Viscoelasticity Measurement

Portions of the insulation films were cut out from the insulated electric wires produced as described above, and their viscoelasticities were measured by a dynamic viscoelasticity measuring instrument DVA-200 (I. T. Keisoku Seigyo Co., Ltd.). The measurement was performed at temperatures ranging from 50 degrees C. to 400 degrees C., at a temperature rising rate of 10 degrees C./min, and at 1 Hz. From measured dynamic viscoelasticity results, the loss elastic moduli and the storage elastic moduli were obtained, and further the peak values of the loss tangents tan δ represented by the loss modulus to storage modulus ratios were obtained.

Flexibility Evaluation

Flexibility evaluation was conducted as follows:
After drawing the insulated electric wires produced as described above by 30 percent, edgewise bending testing was performed at a double diameter (i.e. twice a rectangular conductor width, for example 4 mm diameter in the case of 2 mm rectangular conductor width). A pass or a fail was determined according to the presence or absence of crack formation, with a microscope. A "Pass" was given for no crack formation found, or a "Fail" was given for crack formation found. The evaluated results are shown in Table 1.

TABLE 1

| | Example 1 | Example 2 | Example 3 | Example 4 | Comparative example 1 |
|---|---|---|---|---|---|
| Peak value of loss tangent tan δ | 0.08 | 0.60 | 0.30 | 0.18 | 1.7 |
| Imide concentration of insulating film (mass %) | 36.6 | 30.0 | 32.5 | 32.7 | 15.7 |
| Flexibility evaluation result | Pass | Pass | Pass | Pass | Fail |

The maximum values of the loss tangents tan δ in Examples 1 to 4 were 0.08 to 0.60, which were smaller than 1.0. The loss tangent tan δ in Comparative example 1 was 1.7. The flexibility evaluation results are shown in Table 1 above, and it was found that Examples 1 to 4 being smaller than 1.0 in the peak value of the loss tangent tan δ were superior in flexibility.

Incidentally, the present invention is not limited to the above described exemplary embodiment and the above described examples, but various modifications thereto may be made.

EXPLANATION OF REFERENCE NUMERALS

1: Insulated electric wire, 2: Coil, 10: Rectangular conductor, 11: Insulation film

What is claimed is:
1. An insulated electric wire, comprising:
a rectangular conductor; and
an insulation film provided around the rectangular conductor,
wherein the insulation film is essentially consisted of a polyimide resin consisted of an acid component and a diamine component, the diamine component including 4,4'-bis(4-aminophenoxy) biphenyl (BAPB), and has a peak value of a loss tangent tan δ represented by a loss elastic modulus to storage elastic modulus ratio when measured in a range of 50 degrees C. to 400 degrees C. is smaller than 1.0,
wherein the diamine component further includes 4,4'-diaminodiphenyl ether (ODA),
wherein a compounding ratio of ODA/BAPB is in a range from 50/50 to 90/10, and
wherein a compounding ratio of pyromellitic anhydride (PMDA)/3,3',4,4'-biphenyltetracarboxylic dianhydride (BPDA) in the acid component is in a range from 50/50 to 80/20.

2. The insulated electric wire according to claim 1, wherein the peak value of the loss tangent tan δ of the insulation film is not greater than 0.8.

3. The insulated electric wire according to claim 1, wherein the polyimide resin has an imide concentration of not lower than 28 percent by mass and not higher than 37 percent by mass.

4. The insulated electric wire according to claim 1, wherein the insulation film is being formed by applying a polyamic acid varnish to a perimeter of the rectangular conductor, and subsequent baking, and wherein the polyamic acid varnish is derived from the diamine component including the 4,4'-bis(4-aminophenoxy) biphenyl (BAPB) and the acid component including the pyromellitic anhydride (PMDA) and the 3,3',4,4'-biphenyltetracarboxylic dianhydride (BPDA).

5. The insulated electric wire according to claim 1, wherein the insulation film comprises a thickness of not thinner than 50 μm.

6. A coil, formed by using the insulated electric wire according to claim 1.

7. The insulated electric wire according to claim 1, wherein the acid component includes at least two kinds of tetracarboxylic acid dianhydride.

8. The insulated electric wire according to claim 7, wherein the tetracarboxylic acid dianhydride includes the pyromellitic anhydride (PMDA).

9. The insulated electric wire according to claim 1, wherein the acid component includes two kinds of tetracarboxylic acid dianhydride and one of which includes the pyromellitic anhydride (PMDA).

10. The insulated electric wire according to claim 9, wherein another tetracarboxylic acid dianhydride includes the 3,3',4,4'-biphenyltetracarboxylic dianhydride (BPDA).

11. The insulated electric wire according to claim 1, wherein the polyimide resin is derived from reacting the diamine component and the acid component at a temperature of not higher than 100 degrees C.

12. The insulated electric wire according to claim 1, wherein the peak value of the loss tangent tan δ is in a range from 0.05 to 0.7.

* * * * *